(12) United States Patent
Lin et al.

(10) Patent No.: US 11,093,928 B2
(45) Date of Patent: Aug. 17, 2021

(54) ELECTRONIC SYSTEM AND AUTOMATIC WEBSITE LOGIN AND SECURITY PAYMENT METHOD USING NEAR-FIELD COMMUNICATION

(71) Applicant: Wistron Corp., New Taipei (TW)

(72) Inventors: Yung-Chin Lin, New Taipei (TW); Ping-Hung Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 567 days.

(21) Appl. No.: 15/662,041

(22) Filed: Jul. 27, 2017

(65) Prior Publication Data

US 2018/0232723 A1  Aug. 16, 2018

(30) Foreign Application Priority Data

Feb. 10, 2017 (TW) .................................. 106104375

(51) Int. Cl.
| | |
|---|---|
| *G06Q 20/32* | (2012.01) |
| *G06F 21/35* | (2013.01) |
| *H04L 29/06* | (2006.01) |
| *H04W 88/02* | (2009.01) |
| *H04W 12/06* | (2021.01) |

(52) U.S. Cl.
CPC ......... *G06Q 20/3226* (2013.01); *G06F 21/35* (2013.01); *G06Q 20/3278* (2013.01); *H04L 63/08* (2013.01); *H04L 63/0853* (2013.01); *H04W 12/068* (2021.01); *H04W 88/02* (2013.01); *H04L 2463/102* (2013.01)

(58) Field of Classification Search
CPC ............ G06Q 20/3226; G06Q 20/3278; G06F 21/35; H04L 63/08; H04L 63/0853; H04L 2463/102; H04W 12/06; H04W 88/02
See application file for complete search history.

(56) References Cited

U.S. PATENT DOCUMENTS

| | | | | |
|---|---|---|---|---|
| 2012/0329388 | A1* | 12/2012 | Royston | ............ H04W 12/0609 455/41.1 |
| 2013/0185769 | A1* | 7/2013 | Jian | ......................... H04L 63/08 726/4 |

(Continued)

FOREIGN PATENT DOCUMENTS

| | | |
|---|---|---|
| CN | 102857263 A | 1/2013 |
| CN | 103975615 A | 8/2014 |

*Primary Examiner* — John W Hayes
*Assistant Examiner* — Ari Shahabi (57) ABSTRACT

An automatic website login and security payment method is provided. The method includes the steps of: utilizing a mobile device to transmit transaction authentication program information to a computer device via near-field communication, wherein the transaction authentication program information includes a database file and a transaction authentication program; detecting at least one website that is being visited by the computer device via the transaction authentication program; when the database file includes user information corresponding to the at least one website, inputting the user information in the database file into the at least one website; and when the database file does not include the user information corresponding to the at least one website, capturing the user information that is input on the at least one website via the transaction authentication program.

14 Claims, 8 Drawing Sheets

(56) References Cited

U.S. PATENT DOCUMENTS

| | | | | |
|---|---|---|---|---|
| 2014/0317708 A1* | 10/2014 | Adrangi | ............... | H04W 12/06 |
| | | | | 726/7 |
| 2015/0281227 A1* | 10/2015 | Fox Ivey | .............. | H04L 9/3226 |
| | | | | 713/168 |
| 2017/0243105 A1* | 8/2017 | Takeuchi | ......... | G06K 19/07741 |

* cited by examiner

ELECTRONIC SYSTEM AND AUTOMATIC WEBSITE LOGIN AND SECURITY PAYMENT METHOD USING NEAR-FIELD COMMUNICATION

CROSS REFERENCE TO RELATED APPLICATIONS

This Application claims priority of Taiwan Patent Application No. 106104375, filed on Feb. 10, 2017, the entirety of which is incorporated by reference herein.

BACKGROUND OF THE INVENTION

Field of the Invention

The present invention relates to near-field communication, and, in particular, to an electronic system and an automatic website login and security payment method using near-field communication.

Description of the Related Art

With the advancement of technology, electronic commerce (E-commerce) shopping websites have grown popular and convenient. There are various popular shopping websites and auction websites on the Internet, such as Amazon, Taobao, PChome Shopping, eBay, etc. However, a user has to manually input his or her user account, password, credit card information, or debit card information onto the websites before executing a payment transaction. During the procedure of manually inputting the aforementioned information, the user may forget his or her user account and password. Additionally, there may be some credit cards or debit cards on promotions, discount activities, or zero-interest installments for the website, and the information may be a burden on the user's memory. If the user forgets to carry his or her credit card or debit card, the user cannot shop online.

Nowadays, mobile devices such as smartphones and tablet PCs are becoming more and more popular, and mobile devices on the market are usually equipped with near-field communication functionality. However, these mobile devices cannot improve the convenience for the user to shop online because a dedicated chip or a specific mobile payment system is required. Additionally, the user may probably use different internet browsers on a computer device to connect to different shopping websites, and the payment transaction on a conventional mobile device can only be performed on some specific internet browsers, and thus not all internet browsers are supported, resulting in trouble for the user.

Accordingly, there is demand for an automatic website login and security payment method using a mobile device to improve the convenience for the user to shop online.

BRIEF SUMMARY OF THE INVENTION

A detailed description is given in the following embodiments with reference to the accompanying drawings.

In an exemplary embodiment, an automatic website login and security payment method is provided. The method includes the steps of: utilizing a mobile device to transmit transaction authentication program information to a computer device via near-field communication, wherein the transaction authentication program information comprises a database file and a transaction authentication program; detecting at least one website that is being visited by the computer device via the transaction authentication program; when the database file comprises user information corresponding to the at least one website, inputting the user information in the database file into the at least one website; and when the database file does not comprise the user information corresponding to the at least one website, capturing the user information that is input on the at least one website via the transaction authentication program.

In another exemplary embodiment, an electronic system is provided. The electronic system includes a mobile device and a computer device. The mobile device is configured to store transaction authentication program information, wherein the transaction authentication program information comprises a database file and a transaction authentication program. The mobile device transmits the transaction authentication program information to the computer device via near-field communication, and the computer device executes the transaction authentication program. The transaction authentication program detects at least one website being visited by the computer device. When the database file comprises user information corresponding to the at least one website, the transaction authentication program inputs the user information in the database file into the at least one website. When the database file does not comprise the user information corresponding to the at least one website, the transaction authentication program captures the user information that is input on the at least one website.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
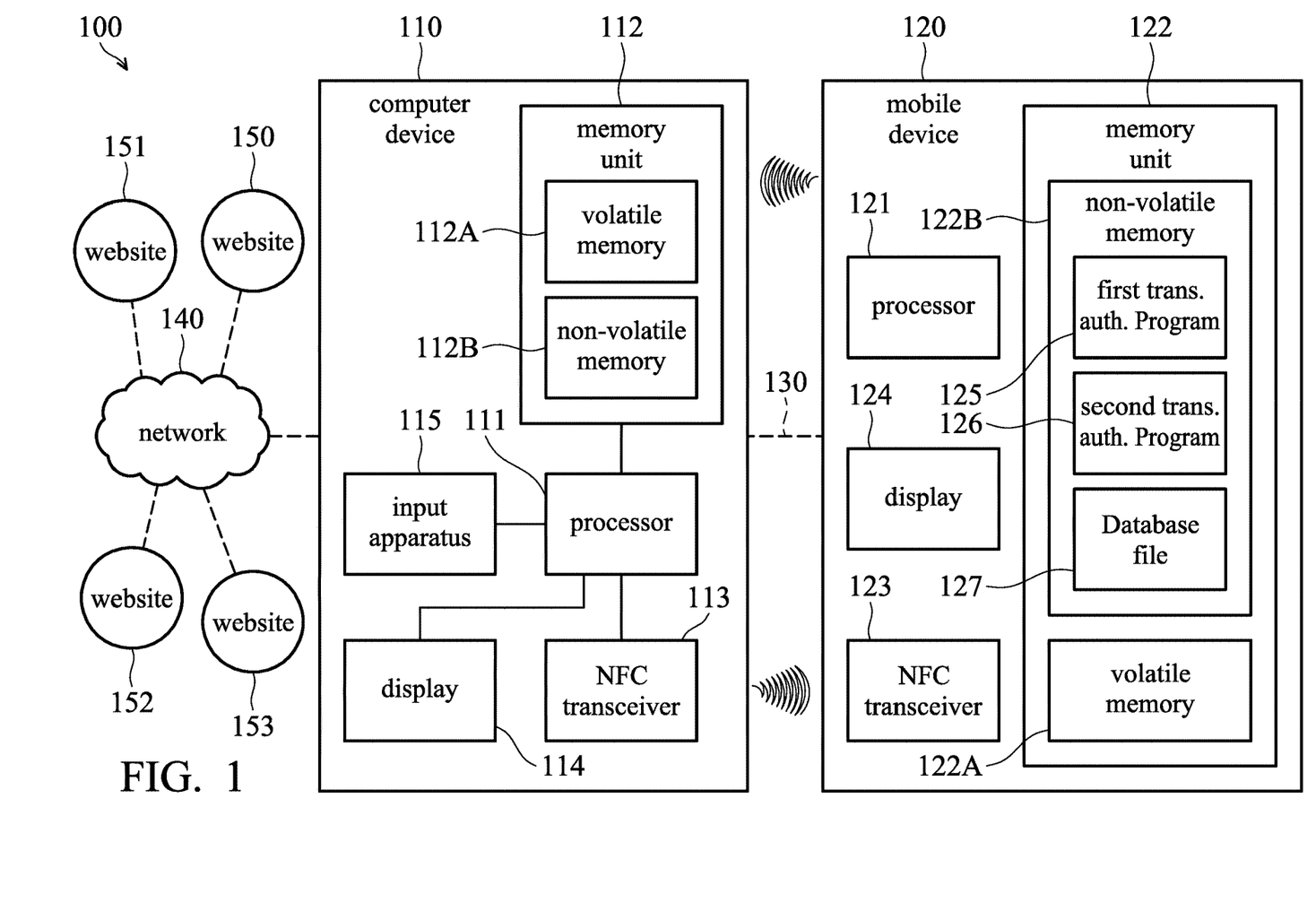
FIG. 1 is a block diagram of an electronic system in accordance with an embodiment of the invention.

FIG. 1 is a block diagram of an electronic system in accordance with an embodiment of the invention. As shown in FIG. 1, the electronic system 100 includes a mobile device 120 and a computer device 110.

The mobile device 120 includes a processor 121, a memory unit 122, a near-field communication (NFC) transceiver 123, and a display 124. The processor 121 may be a central processing unit (CPU) or a digital signal processor (DSP), but the invention is not limited thereto.

The memory unit 122 includes a volatile memory 122A and a non-volatile memory 122B. The non-volatile memory 122B is configured to store one or more operating systems (e.g. ANDROID or iOS operating systems) and various applications for execution on the mobile device 120, such as a first transaction authentication program 125, a second transaction authentication program 126, and a database file 127. The first transaction authentication program 125 is performed by the mobile device 120 and the second transaction authentication program 126 is performed by the computer device 110. The database file 127 records user's user data (e.g. user accounts and passwords on various shopping websites) and credit card or debit card information (e.g. credit card number, user name, valid date, and credit card verification value (CVV)), and associated column ID information, button information of the user data on each shopping website, where the credit card or debit card information can be regarded as "payment information". It should be noted that the terms "first transaction authentication program 125" and "second transaction authentication program 126" of the application are used to classify the transaction authentication programs that are respectively executed on the mobile device 120 and the computer device 110, and the numerals used for these terms is not meant to limit the terms. In some embodiments, the second transaction authentication program 126 for execution on the computer device 110 can be regarded as a "transaction authentication program", and the first transaction authentication program 125 for execution on the mobile device 120 can be regarded as a "mobile transaction authentication program".

The volatile memory 122A, for example, may be a random access memory (e.g. a static random access memory (SRAM) or dynamic random access memory (DRAM)), and the processor 121 loads the operating system and applications stored in the non-volatile memory 122B to the volatile memory 122A for execution.

The display 124 may be a liquid crystal display (LCD) or an organic light-emitting diode (LED) display, but the invention is not limited thereto. In some embodiments, the display 124 may be a display device equipped with a touch control device (i.e. a touch screen), and the user may input specific touch commands on the touch screen via his or her finger or a stylus to control corresponding applications.

In an embodiment, the processor 121 may connect to the computer device 110 via the NFC transceiver 123, and transmit and receive the applications and database file required for performing the automatic website login and security payment method of the invention. For example, the user may hold the mobile device 120 and approach the NFC transceiver 113 of the computer device 110 to a specific distance (e.g. within 20 centimeters), and data transmission between the mobile device 120 and the computer device 110 can be established using a near-field communication protocol. Specifically, the data transmission between the mobile device 120 and the computer device 110 supports NFC Data Exchange Format (NDEF) that is an interface for data transmission between different NFC devices.

In an embodiment, the computer device 110 includes a processor 111, a memory unit 112, an NFC transceiver 113, a display 114, and an input apparatus 115. For example, the computer device 110 may be a personal computer, a tablet PC, a laptop, an All-in-one computer, or a server. The processor 111 may be a central processing unit (CPU) or a digital signal processor (DSP), but the invention is not limited thereto.

The memory unit 112 includes a volatile memory 112A and a non-volatile memory 112B. The non-volatile memory 112B is configured to store one or more operating systems (e.g. Windows, Mac, or Linux operating systems) and various applications for execution on the computer device 110. The volatile memory 112A, for example, may be a random access memory (e.g. a static random access memory (SRAM) or dynamic random access memory (DRAM)), and the processor 111 loads the operating system and applications stored in the non-volatile memory 112B to the volatile memory 112A for execution.

The NFC transceiver 113, for example, supports the NFC Data Exchange Format (NDEF), and the data transmission between the computer device 110 and the mobile device 120 can be performed via near-field communication.

The display 114 may be a liquid crystal display (LCD) or an organic light-emitting diode (LED) display, but the invention is not limited thereto. In some embodiments, the display 114 may be a display device equipped with a touch control device (i.e. a touch screen), and the user may input specific touch commands on the touch screen via his or her finger or a stylus to control corresponding applications.

The input apparatus 115 may be an input apparatus such as a keyboard, a touch screen, a mouse, or a trackball, and the user may input his or her user data (e.g. user account and password) or credit card or debit card information on the display 114 via the input apparatus 115. In an embodiment, the processor 111 may connect to websites 150~153 through a network 140 via a network interface (not shown in FIG. 1), where the websites 150~153 may be different shopping websites, auction websites, house rental websites, or job-seeking websites, but the invention is not limited thereto. It should be noted that, for purposes of description, only websites 150~153 are illustrated in FIG. 1, and the number of websites is not limited in the invention.

In an embodiment, the user may connect to one of the websites 150~153 via the computer device 110, and visit a login page. Generally, when the user logs in to the website for the first time, the user has to manually input his or her user account and password for that website. Meanwhile, the user may hold the mobile device 120 to approach the NFC transceiver 113 of the computer device 110. Specifically, the first transaction authentication program 125 is executed by the mobile device 120 and the user has logged in to the first transaction authentication program 125 with his or her account and password. When the processor 121 of the mobile device 120 is connected to the computer device 110 via an NFC protocol (e.g. NDEF), the first transaction authentication program 125 executed by the processor 121 may transmit the second transaction authentication program 126 and the database file 127 associated with the user to the computer device 110.

Figure 4:
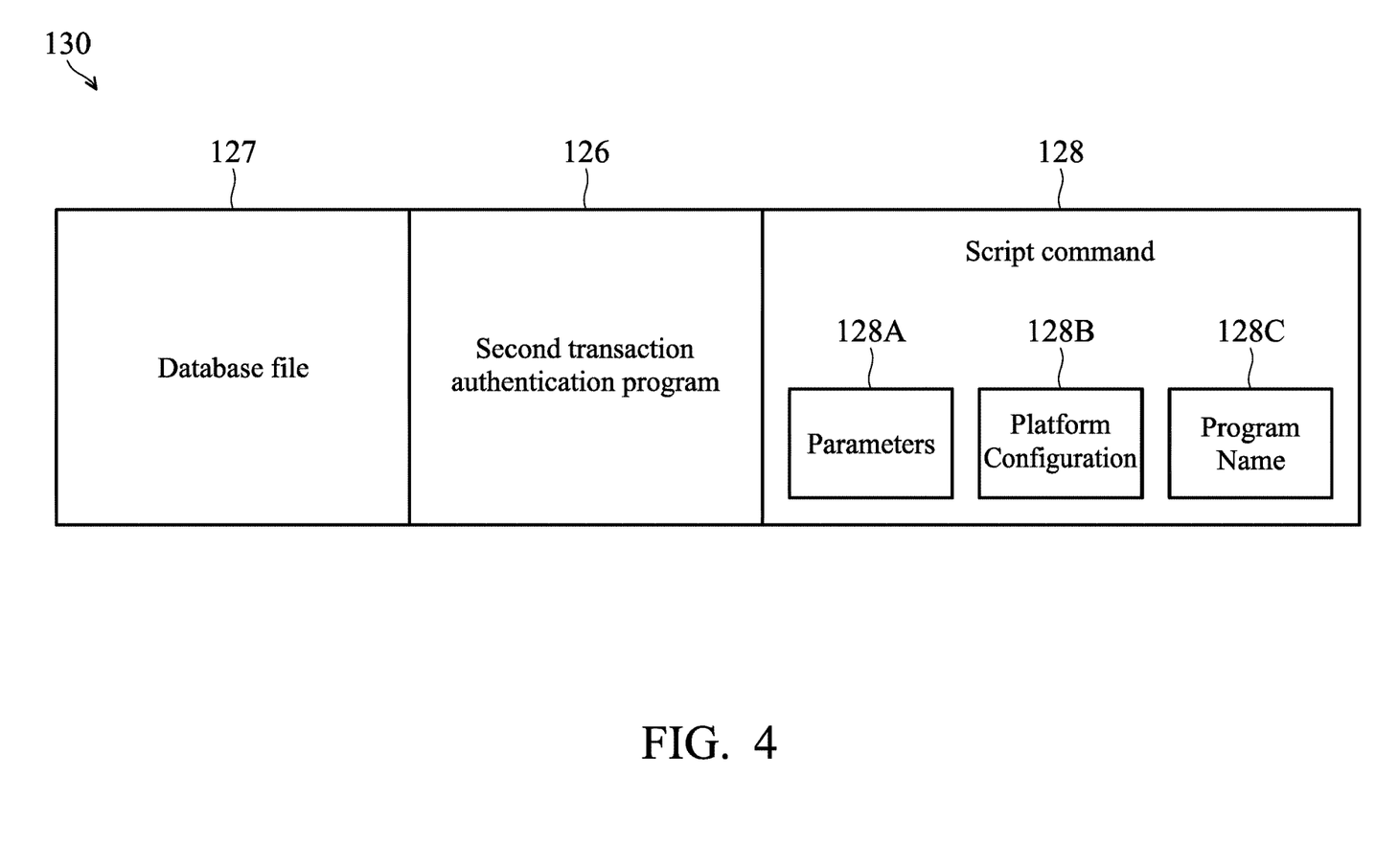
FIG. 4 is a diagram of a near-field communication data exchange format (NDEF) in accordance with an embodiment of the invention.

It should be noted that a script command 128 is simultaneously transmitted to the computer device 110 while the mobile device 120 transmits the second transaction authentication program 126 and the database file 127 to the computer device 110, so that the computer device 110 may automatically execute the second transaction authentication program 126 based on the script command 128. For example, the NDEF 130 transmitted from the mobile device 120 to the computer device 110 includes the database file 127, the second transaction authentication program 126, and an associated script command 128, as shown in FIG. 4. The script command 128 includes parameters 128A, a platform configuration 128B, and a program name 128C. For example, the parameters 128A are parameters and settings required for automatically executing the second transaction authentication program 126 on the computer device 110. The platform configuration 128B indicates the operating system currently executed by the computer device 110, such as Windows 7, Windows 8, Windows 10, or MacOS, but the invention is not limited thereto. The program name 128C is the name of the second transaction authentication program 126.

The database file 127 is encrypted with an encryption standard such as AES or 3DES before being packed into the NDEF.

After the computer device 110 automatically executes the second transaction authentication program 126, the second transaction authentication program 126 may detect the logon operations and transaction operations on different websites, and records the user account and password, credit card or debit card information, or other shopping information such as a delivery address and telephone number on each website. The second transaction authentication program 126 may further record at least one button-pressing operation of the user on the website.

Specifically, the second transaction authentication program 126 may first determine whether the database file 127 received from the mobile device 120 by the computer device 110 includes the user account and password of the website currently logged in. If so, the second transaction authentication program 126 may automatically log in the website according to the user account and password recorded in the database file 127. Otherwise, the second transaction authentication program 126 may record the user account and password that are manually input by the user and successfully log in to the website.

Similarly, when the user has logged in to the website and has visited a transaction page of a specific product for inputting credit card or debit card information for completing the transaction, the second transaction authentication program 126 may determine whether the database file 127 received from the mobile device 120 by the computer device 110 includes the credit card or debit card information of the user. If so, the second transaction authentication program 126 may automatically input the credit card or debit card information of the user on the transaction page and the user may confirm the input credit card or debit card information to complete the transaction. Otherwise, the second transaction authentication program 126 may record the credit card or debit card information that is manually input by the user on the transaction page. Details for the automatic website login and security payment method of the invention will be described in the following embodiments.

FIGS. 2A-2D are diagrams illustrating scenarios of logging into different shopping websites and performing a transaction in accordance with an embodiment of the invention.

Figure 2A:
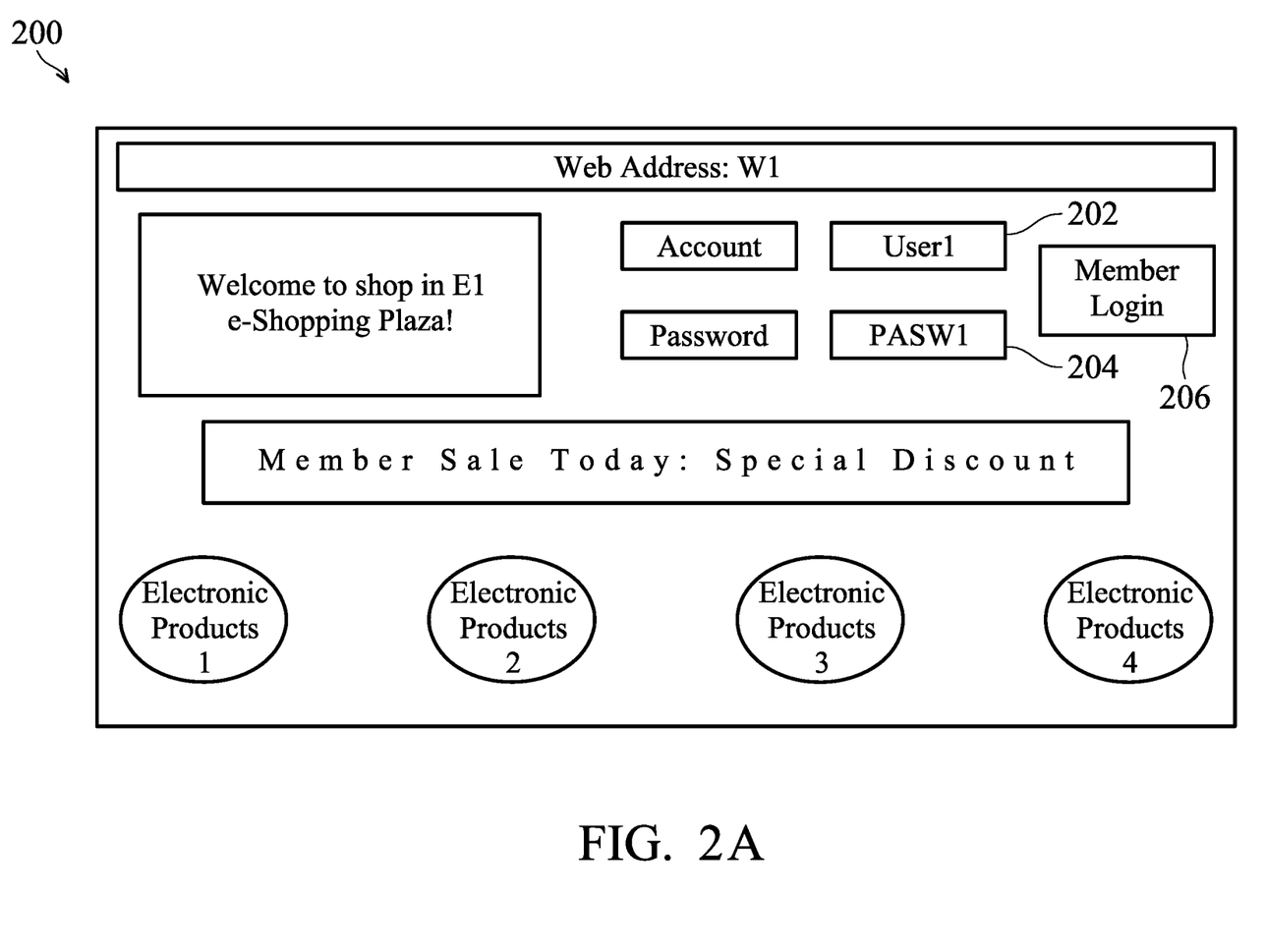
FIGS. 2A-2D are diagrams illustrating scenarios of logging into different shopping websites and performing a transaction in accordance with an embodiment of the invention.

As illustrated in FIG. 2A, screen 200 illustrates the user account and password of the user while logging into the shopping website E1 having a web address W1. For example, the page of the shopping website E1 shown on screen 200 includes a column 202 of a user account User1, a column 204 of a password PASW1, and a member login button 206. The second transaction authentication program 126 may analyze the source code of the shopping website E1 on screen 200 (e.g. a logging screen), and obtain input strings of corresponding columns that are temporarily stored in the volatile memory 112A of the computer device 110. For purposes of description, the source codes are described with HyperText Markup Language (HTML) as an example in the following embodiments, but the invention is not limited thereto.

For example, the uniform resource locator (URL) of the shopping website E1 includes keywords of "www.XXXXX.com/login", which is a logging-in link having a HTML source code of:
<a href="https://www.XXXXX.com/login">login</a>

The second transaction authentication program 126 may analyze the aforementioned source code of the logging-in page of the shopping website E1 to obtain a login link, and the webpage having this login link is a login webpage.

The second transaction authentication program 126 may search for attribute name information (e.g. id or name) that is equal to the ID of corresponding user account column from the source code. For example, the column id of the user account column is U1 which has an HTML code of:
<input id="U1" title="account">

The second transaction authentication program 126 may search for attribute name information that is equal to the ID of corresponding password column from the source code. For example, the column id of the password column is P1 which has an HTML code of:
<input id="P1" title="password">

The second transaction authentication program 126 may search for attribute name information that is equal to the ID of corresponding member login button from the source code. For example, the id of the member login button is L1 which has an HTML code of:
<button id="L1">member login</button>

The second transaction authentication program 126 may search for attribute name information that is equal to the ID of corresponding transaction button from the source code. For example, the id of the transaction button is T1 which has an HTML code of:
<button id="T1">transaction</button>

Specifically, if the user data corresponding to the shopping website E1 have been recorded in the database file 127, the second transaction authentication program 126 may retrieve the attribute name information of each column on the shopping website E1 having a web address W1, such as the attribute name information about column 202 of the user account User1, column 204 of the password PASW1, and the member login button 206, and then fill corresponding data into each column, thereby automatically logging into the shopping web site E1.

Figure 2B:
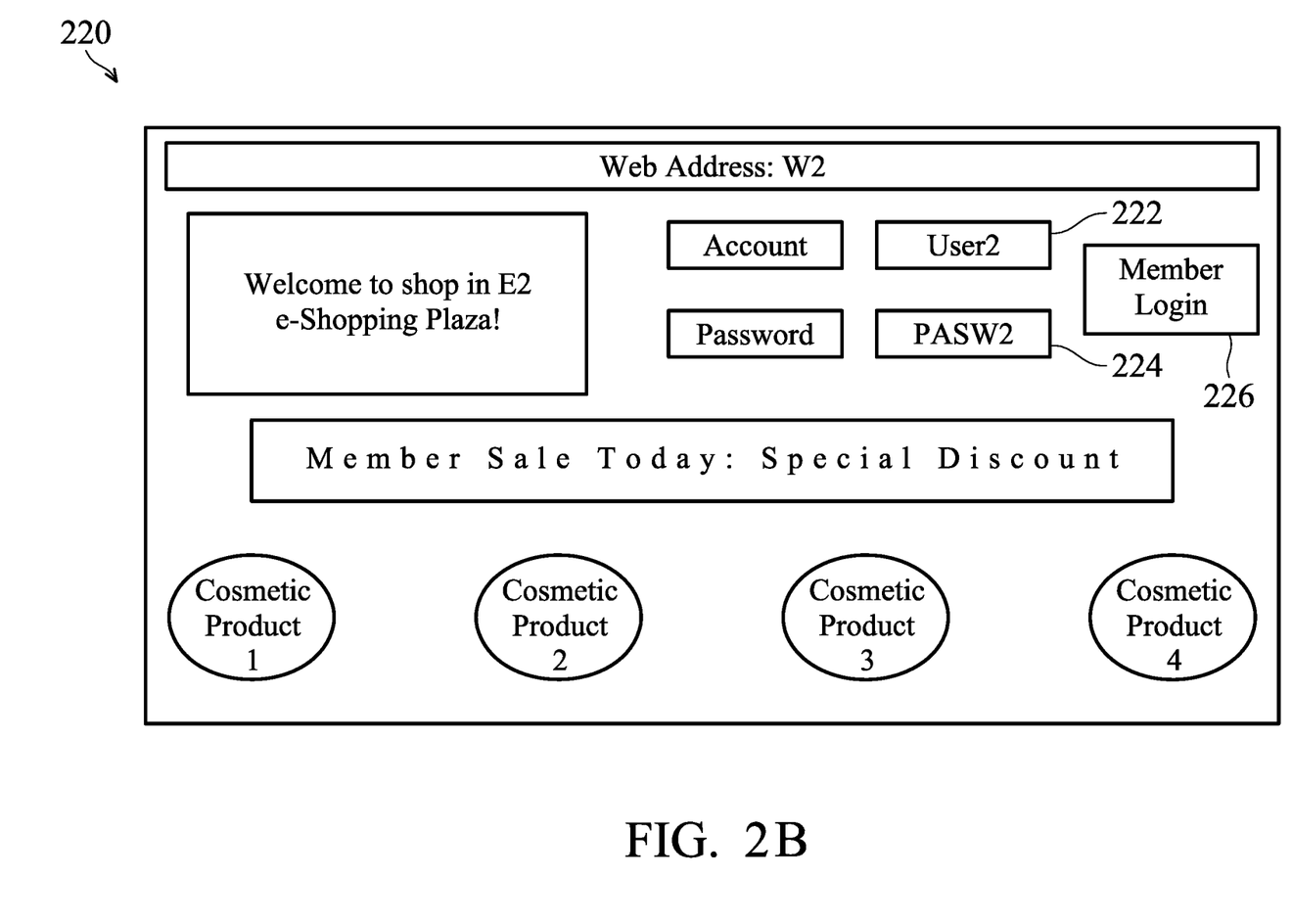

Referring to FIG. 2B, similarly, the second transaction authentication program 126 may also analyze the source code of the shopping website E2 having a web address W2 on screen 220 to obtain a column 222 of a user account User2, a column 224 of a password PASW2, and a member login button 226. Specifically, if the user data corresponding to the shopping website E2 have been recorded in the database file 127, the second transaction authentication program 126 may retrieve the attribute name information of each column on the shopping website E2 having a web address W2, such as information of column 222 of the user account User2, column 224 of the password PASW2, and the member login button 226, and then fill corresponding data into each column, thereby automatically logging into the shopping web site E2.

Figure 2C:
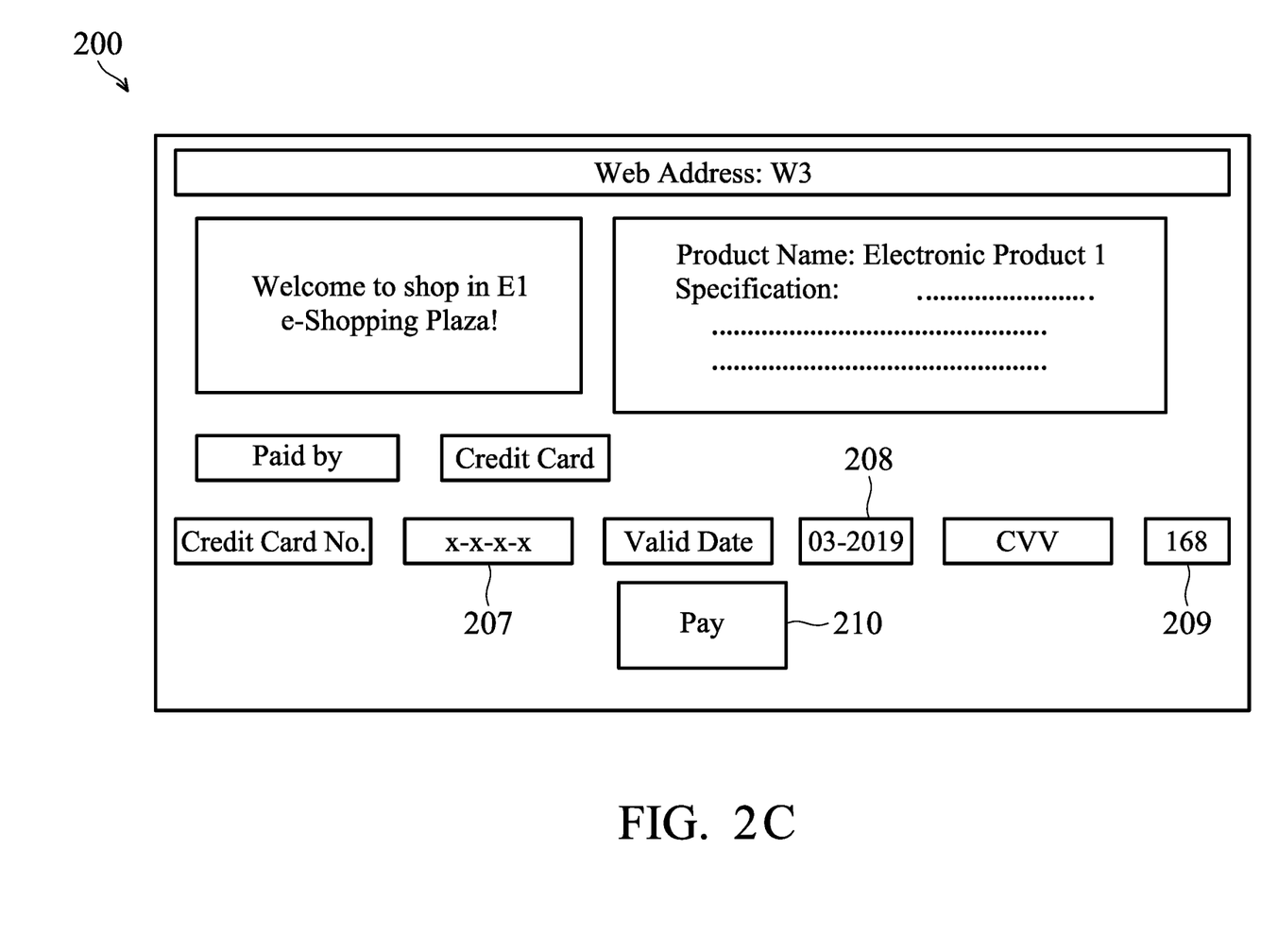

Referring to FIG. 2C, when the user visits a transaction page 200 of the shopping website E1, the second transaction authentication program 126 may also search for the corresponding credit card columns (e.g. credit card number, valid date, and CVV) of the shopping website E1 having a web address W3, and search for successful transactions (e.g. determining whether keywords of "successful transaction" exist in the source code), thereby obtaining data in corresponding columns of a credit card, such as column 207 of the credit card number, column 208 of the valid date, column 209 of the CVV, and a transaction button 210. Specifically, if the payment information of the shopping website E1 has been recorded in the database file 127, the second transaction authentication program 126 may search for the source code of the shopping website E1 to obtain the attribute name information of each column of the shopping web site E1 having a web address W3, such as the attribute name information about column 207 of the credit card number, column 208 of the valid date, column 209 of the CVV, and a transaction button 210, and automatically fill corresponding data into each column, thereby automatically making a payment on the shopping web site E1.

Figure 2D:
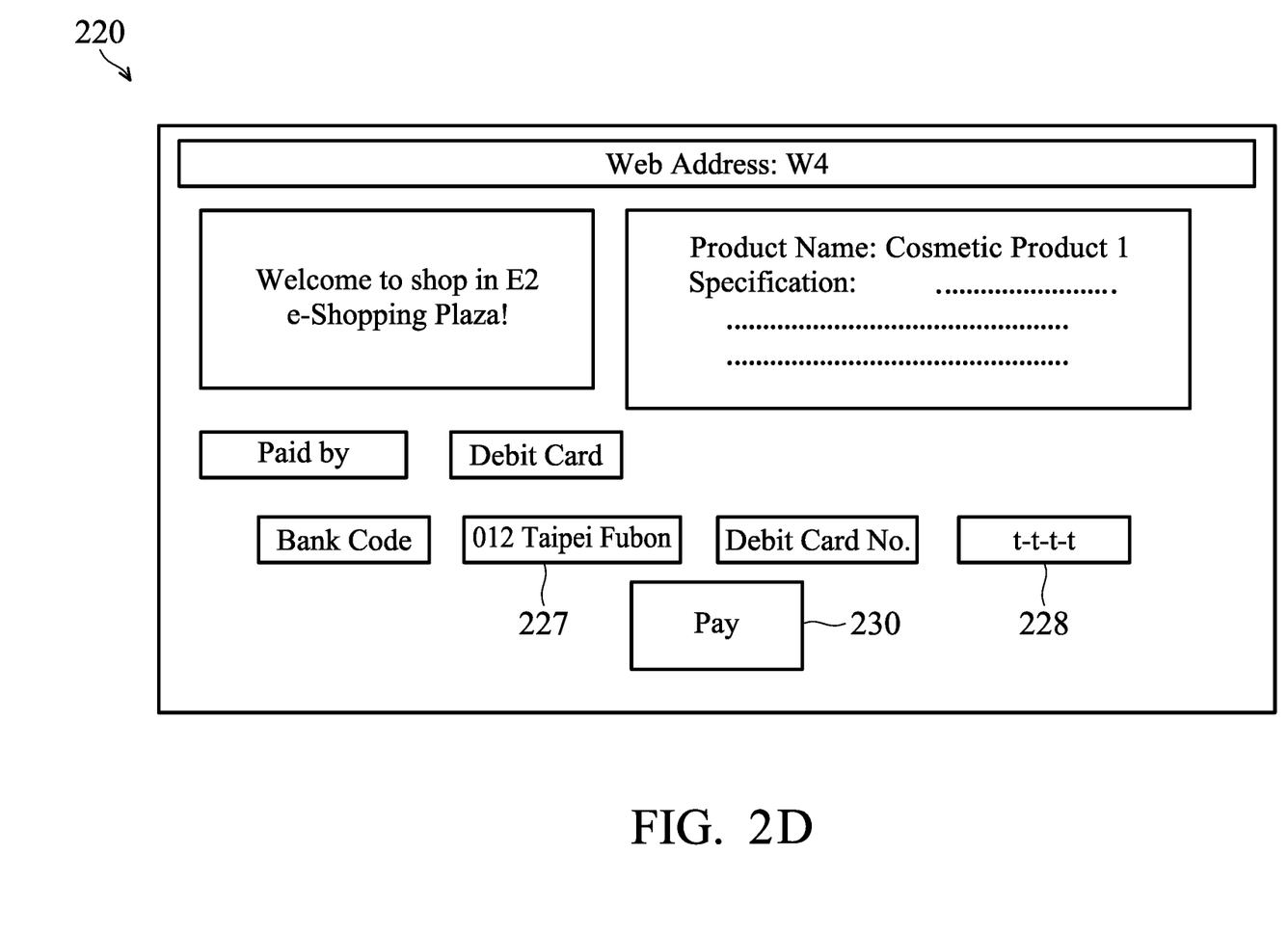

Referring to FIG. 2D, when the user visits a transaction page 220 of the shopping website E2, the second transaction authentication program 126 may also search for the corresponding credit card columns (e.g. bank code, debit card number, etc.) of the shopping website E2 having a web address W4, and search for successful transactions (e.g. determining whether keywords of "successful transaction" exist in the source code), thereby obtaining data in corresponding columns of a debit card, such as column 227 of the bank code, column 228 of the debit card number, and a transaction button 230. Specifically, if the payment information of the shopping website E2 has been recorded in the database file 127, the second transaction authentication program 126 may search for the source code of the shopping web site E2 to obtain the attribute name information of each column of the shopping website E2 having a web address W4, such as the attribute name information about column 227 of the bank code, column 208 of the debit card number, and a transaction button 230, and automatically fill corresponding data into each column, thereby automatically making a payment on the shopping website E2.

Taking the shopping website E1 for example, it should be noted that if the user data and payment information are not recorded in the database file 127 of the shopping web site E1 in the embodiments of FIG. 2A and FIG. 2C, it indicates that the user has to manually input the user data or payment information to log in to the shopping website E1 or make a payment. Meanwhile, the second transaction authentication program 126 may automatically record the data and corresponding column ID that are input by the user on the shopping website E1, and the recorded input data and corresponding column IDs can be written into the database file 127.

For example, in the embodiments of FIGS. 2A-2D, the columns recorded by the second transaction authentication program 126 are illustrated in Table 1:

TABLE 1

| Address | User Acc. | Password | Login Button | Credit Card No. | Valid Date | CVV | Debit Bank Code | Debit Card No. | Trans. Button |
|---------|-----------|----------|--------------|-----------------|------------|-----|-----------------|----------------|---------------|
| W1 | User1 | PASW1 | Member login | | | | | | |
| W2 | User2 | PASW2 | Member Login | | | | | | |
| W3 | | | | x-x-x-x | March 2019 | 168 | | | Yes |
| W4 | | | | | | | 012 | t-t-t-t | Yes |

The columns recorded in the database file 127 are illustrated in Table 1, but it should be noted that information of a single credit card and a single debit card are illustrated in the aforementioned example, and the invention is not limited thereto. The user may utilize the second transaction authentication program 126 performed by the computer device 110 to capture other credit card information or debit card information that are manually input from the computer device 110 by the user. The user may also manage or edit the credit card information and debit card information recorded in the database file 127 via a user interface of the first transaction authentication program 125, and the details will be described later. It should be noted that the columns recorded in the database file 127 includes button operations (e.g. columns of login button and transaction button), thereby confirming that the user has successfully logged in to the website or successfully make a payment. In addition, the column data recorded in the database file 127 can be input data from option operations. For example, the column of the valid date in Table 1 can be the data manually entered from an optional operation by the user.

In another embodiment, the columns recorded in the database file 127 for the shopping website E1 (e.g. login address W1 and transaction address W3) are shown in Table 2-1 and Table 2-2:

TABLE 2-1

| Address | User Account ID | User Account Data | Password ID | Password Data | Login Button ID | Login Button | Transaction Type ID | Transaction Type Data |
|---------|-----------------|-------------------|-------------|---------------|-----------------|--------------|---------------------|-----------------------|
| W1 | U1 | User1 | P1 | PASW1 | L1 | Member login | | |

TABLE 2-1-continued

| Address | User Account ID | User Account Data | Password ID | Password Data | Login Button ID | Login Button | Transaction Type ID | Transaction Type Data |
|---|---|---|---|---|---|---|---|---|
| W3 | | | | | | | S1 | Credit Card |

TABLE 2-2

| Address | Transaction Type Data | Credit Card No. ID | Credit Card No. Data | Valid Data ID | Valid Data Data | CVV ID | CVV Data | Transaction Button ID | Transaction Button |
|---|---|---|---|---|---|---|---|---|---|
| W3 | Credit Card | CR1 | x-x-x-x | VD1 | March 2019 | BN1 | 168 | T1 | Yes |

The columns recorded in the database file 127 for the shopping website E2 (E.g. login address W2 and transaction address W4) are shown in Table 2-3 and Table 2-4:

TABLE 2-3

| Address | User Account ID | User Account Data | Password ID | Password Data | Login Button ID | Login Button | Transaction Type ID | Transaction Type Data |
|---|---|---|---|---|---|---|---|---|
| W2 | U2 | User2 | P2 | PASW2 | L2 | Member login | | |
| W4 | | | | | | | S2 | Debit Card |

TABLE 2-4

| Address | Transaction Type Data | Bank Code ID | Bank Code Data | Debit Card ID | Debit Card No. Data | Transaction Button ID | Transaction Button |
|---|---|---|---|---|---|---|---|
| W4 | Debit Card | BC1 | 012 Taipei Fubon | CR2 | t-t-t-t | T2 | Yes |

Specifically, Table 1 can be used on the mobile device 120 for viewing, managing, and editing by the user. Tables 2-1~2-4 illustrate detailed column content in the database file 127, and each piece of data has a corresponding column ID.

In an embodiment, the user may log in to the first transaction authentication program 125 on the mobile device 120, and add new credit card information for the shopping website E1. For example, the user may activate the first transaction authentication program 125 on the mobile device 120 and view the recorded database file 127. Since the columns of the credit card number, valid date, and CVV are in a format of composite columns, and there is an option for blank data that is for new credit card information manually input by the user. For example, the user may add new blank columns for a credit card number, valid date, and CVV. It should be noted that the newly added blank column has a corresponding column ID, and the second transaction authentication program 126 performed by the computer device 110 may capture and identify the column IDs in the corresponding address. The column data input by the user, such as the newly added credit card information, are illustrated in Table 3:

TABLE 3

| Address | Transaction Type Data | Credit Card No. ID | Credit Card No. Data | Valid Data ID | Valid Data Data | CVV ID | CVV Data | Transaction Button ID | Transaction Button |
|---|---|---|---|---|---|---|---|---|---|
| W3 | Credit Card | CR1 | | VD1 | | BN1 | | T1 | |

The user may also add new credit card information on the mobile device 120, and the first transaction authentication program 125 may update the database file 127 and perform encryption on the database file 127. Specifically, after the first transaction authentication program 125 has updated the database file 127, the first transaction authentication program 125 may transmit the updated database file 127 to the computer device 110 via near-field communication, and the second transaction authentication program 126 may make a payment on the shopping website E1 using the updated database file 127, and then update the database file 127 that was recorded with a successful login and a successful payment.

In some embodiments, the established date of the data in each column is also recorded in the database file 127 for the convenience of management by the user. In addition, when the first transaction authentication program 125 transmits the database file 127 to the computer device 110 via near-field communication, the first transaction authentication program 125 may first transmit data having a newer update date.

It should be noted the second transaction authentication program 126 does not only analyze content on a page of one internet browser, the second transaction authentication program 126 may further analyze source codes of different web sites that are accessed by different internet browsers, and capture user data and credit card or debit card information on different websites. The captured data are updated to the database file 127 that is temporarily stored in the computer device 110.

After the computer device 110 has received the NDEF data transmitted from the mobile device 120, the computer device 110 may automatically execute the second transaction authentication program 126 according to the script command 128 in the NDEF data. Then, the second transaction authentication program 126 decrypts the encrypted database file 127 to obtain data in each column recorded in the unencrypted database file 127, and determines whether any column data are appropriate for the currently browsed website. If so, the second transaction authentication program 126 may automatically input data in each corresponding column (e.g. user account, password, or credit card or debit card information) of the currently browsed website. Otherwise, the second transaction authentication program 126 may record the data that are manually input by the user on the currently browsed website, and the recorded input data are temporarily stored in the volatile memory 112A. When the payment is successfully made, the recorded input data are updated to the database file 127. For example, the database file 127 can be stored in the non-volatile memory 112B of the computer device 110.

Figure 3A:
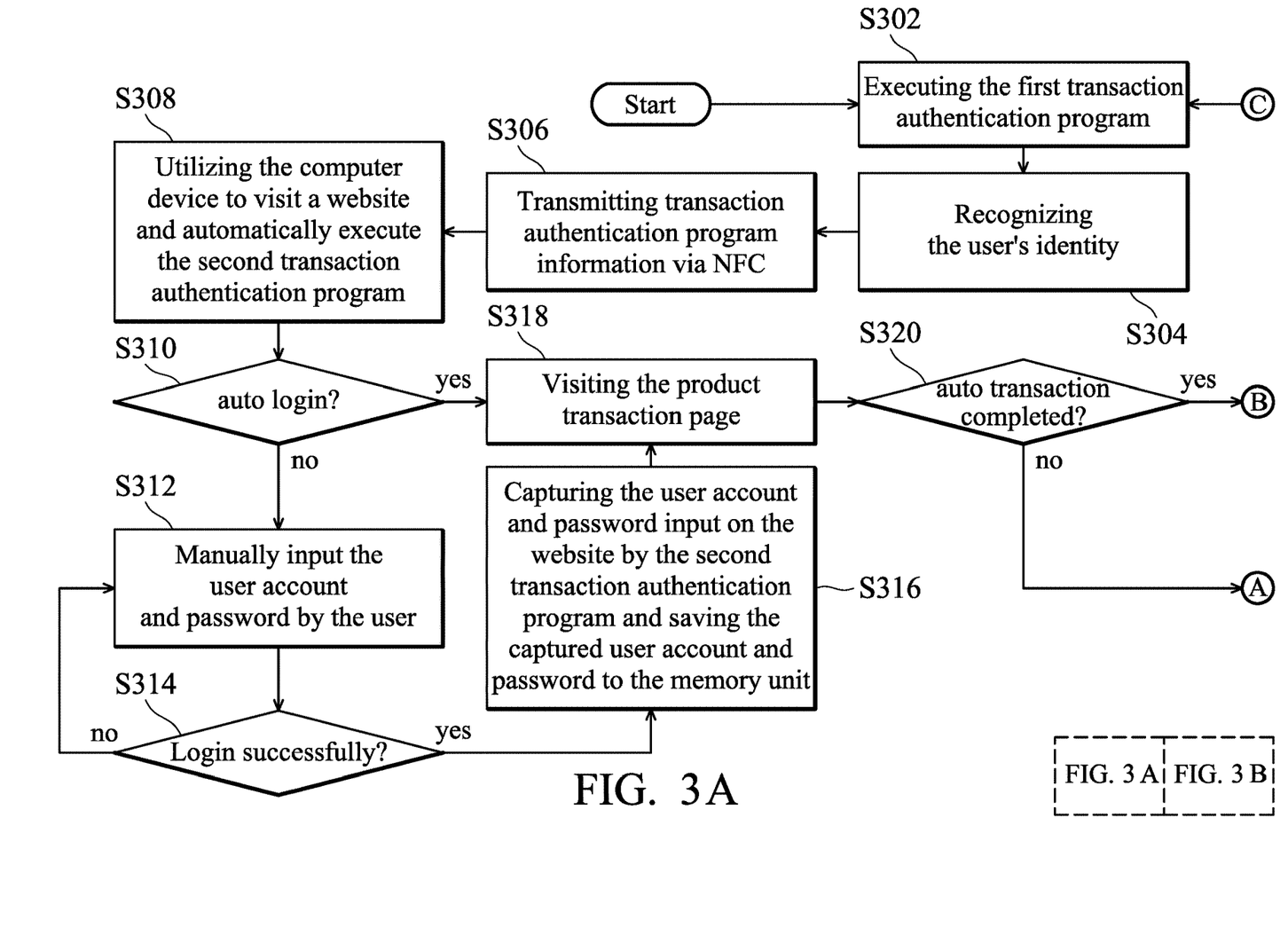
FIGS. 3A-3B are portions of a flow chart of an automatic website login and security payment method in accordance with an embodiment of the invention.
Figure 3B:
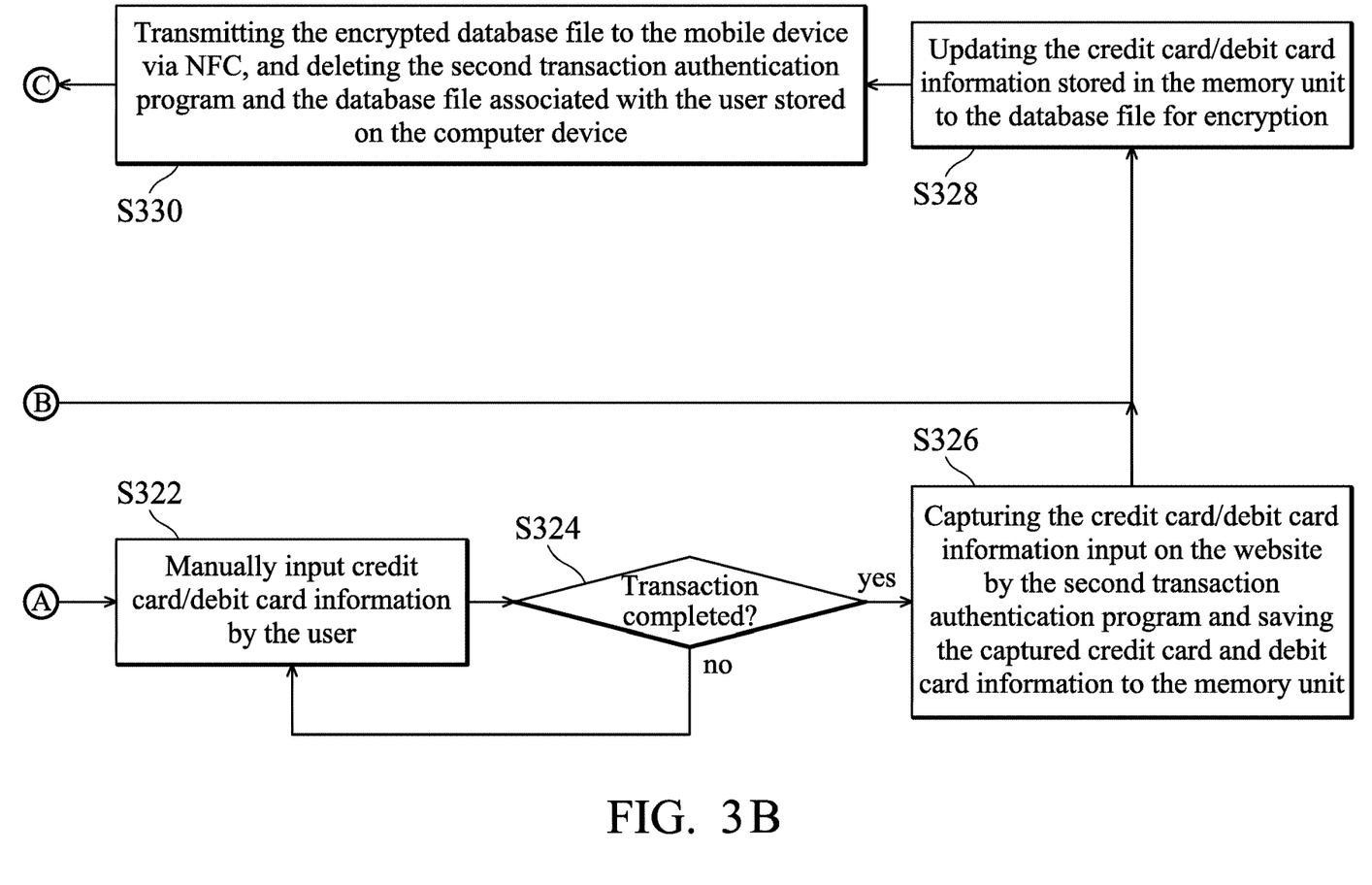

FIGS. 3A-3B are portions of a flow chart of an automatic website login and security payment method in accordance with an embodiment of the invention. In step S302, the first transaction authentication program 125 is executed on the mobile device 120. In step S304, the user's identity is recognized. For example, the user may input a user name and associated passwords on the first transaction authentication program 125 for authentication of the user's identity. For example, various techniques can be used to recognize the user's identity, such as finger recognition, gesture passwords, or voiceprint recognition, but the invention is not limited thereto. Specifically, step S304 can be used to identify different users in the invention, and the content of the database file 127 that is synchronized to the computer device 110 is only associated with the authenticated user.

In step S306, transaction authentication program information is transmitted via near-field communication. For example, the user may hold the mobile device 120 to approach the NFC transceiver 113 of the computer device 110. Meanwhile, the first transaction authentication program 125 may transmit the transaction authentication program information to the computer device 110 via a near-field communication protocol. The transaction authentication program information, for example, supports NDEF, and includes the database file 127, the second transaction authentication program 126, and an associated script command 128.

In step S308, the computer device 110 is utilized to log in to a website and automatically execute the second transaction authentication program 126. For example, the computer device 110 automatically executes the second transaction authentication program 126 according to the script command 128.

In step S310, it is determined whether the automatic logging-in operation is successful. For example, the second transaction authentication program 126 may first decrypt the database file 127 received by the computer device 110 to obtain data in each column of the recorded user data and credit card or debit card information. If the recorded data matches the currently browsed website, the recorded data can be used for automatically logging in to the current website and proceeding to the product transaction page (step S318). If the recorded data does not match the currently browsed website, the user has to manually input his user account and password (step S312).

In step S314, it is determined whether logging into the website is successful. For example, the second transaction authentication program 126 may first analyze the source code of the current web site to obtain the strings of the corresponding columns input by the user, and determines whether the source code of the current web site includes keywords of "successfully logged in", thereby determining whether logging into the current website is successful. If so, the second transaction authentication program 126 may store the captured user account and password into the volatile memory 112A of the memory unit 112 (step S316). Otherwise, step S312 is performed.

In step S320, it is determined whether the automatic payment is successful. For example, the second transaction authentication program 126 may first analyze the source code of the current web site to obtain strings of corresponding columns input by the user to determine whether the source code includes keywords of "successful payment", thereby determining whether the automatic payment is successful. If so, step S328 is performed. Otherwise, step S322 is performed.

In step S322, the user manually input the credit card information or debit card information. In step S324, it is determined whether the payment is successful. If so, the second transaction authentication program 126 may store the captured credit card information or debit card information into the volatile memory 112A of the memory unit 112 (step S326). Otherwise, step S322 is performed.

In step S328, the second transaction authentication program 126 may regard the user data and associated credit card information or debit card information temporarily stored in the memory unit 112 as valid data, and update the valid data to the database file 127 that is further encrypted. In some embodiments, the user data and associated credit card information or debit card information can be regarded as "user information".

In step S330, the computer device 110 transmits the encrypted updated database file 127 to the mobile device 120 via near-field communication, and deletes the second transaction authentication program 126 and associated database file 127 of the user stored on the computer device 110. Specifically, when the database file 127 has the user information corresponding to at least one website, the second transaction authentication program 126 may automatically input the user information stored in the database file 127 to the website. When the database file 127 does not include the user information corresponding to the at least one website, the second transaction authentication program 126 may capture the user information that is input on the at least one website, and update the captured user information to the database file 127.

In view of the above, an electronic system and an automatic website login and security payment method is provided in the invention. The user may utilized his or her mobile device to connect to the computer device via near-field communication, thereby detecting and capturing the user data and credit card or debit card information of each shopping website on the computer device, and feeding back the captured data to the mobile device. When the user wants to make a payment on each shopping website next time, no matter any electronic device or internet browser is used, the user information and associated credit card information or debit card information can be transmitted to the computer device and can be automatically filled in the corresponding columns of the website on the computer device, thereby performing automatic logging-in and payment operations. Accordingly, the convenience for shopping online for the user can be improved using the electronic system and the automatic website login and security payment method provided in the invention.

The methods, or certain aspects or portions thereof, may take the form of program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic website login and security payment method, comprising:
    transmitting, by a mobile device, transaction authentication program information to a computer device via near-field communication, wherein the transaction authentication program information comprises a database file and a transaction authentication program;
    detecting, by the computer device, a first website that is being visited by the computer device via the transaction authentication program;
    determining, by the computer device, that the database file does not comprise user information corresponding to the first website;
    in response to the database file not comprising user information corresponding to the first website, capturing, by the computer device, user information input by a user on the first website via the transaction authentication program and obtaining, by analyzing a source code of the first website by the computer device, attribute name information corresponding to the user information input on the first website;
    detecting, by the computer device, a second website that is being visited by the computer device via the transaction authentication program;
    determining, by the computer device, that the database file does comprise user information corresponding to the second website;
    in response to the database file comprising user information corresponding to the second website, inputting, by the computer device, the user information corresponding to the second website in the database file into the second website and inputting, by the computer device, the user information corresponding to the second website to at least one column on the second website according the corresponding attribute name information;
    determining, by the computer device, that the user has completed a transaction on the second website; and
    on completion of the transaction, transmitting, by the computer device, the database file to the mobile device from the computer device, and deleting, by the computer device, the transaction authentication program information stored in the computer device.

2. The method as claimed in claim 1, wherein the transaction authentication program information further comprises a script command corresponding to the transaction authentication program, and the method further comprises automatically executing, by the computer device, the transaction authentication program according to the script command.

3. The method as claimed in claim 1, further comprising:
    recording the user information input by the user and associated update dates of different websites in the database file by the computer device;
    wherein the user information input by the user having the most recent update date is recorded into the database file first by the mobile device.

4. The method as claimed in claim 1, wherein the user information corresponding to the second website and the user information input by the user in the first website comprises at least one of a user account and a corresponding password of a user, a telephone number, an address, at least one button operation on the at least one website, at least one option operation on the at least one website, credit card information of the user and debit card information of the user.

5. The method as claimed in claim 1, further comprising:
    updating, by the computer device, the captured user information input by the user to the database file.

6. The method as claimed in claim 1, further comprising:
    executing, by the mobile device, a mobile transaction authentication program; and
    recognizing a user of the mobile device by the mobile transaction authentication program;

wherein the database file transmitted by the mobile device to the computer device corresponds to the user.

7. The method as claimed in claim 6, further comprising: editing the database file by the mobile transaction authentication program executed by the mobile device.

8. An electronic system, comprising:

a mobile device;

transaction authentication program information comprising a database file and a transaction authentication program, wherein the transaction authentication program information is stored in a memory of the mobile device; and a computer device;

wherein the mobile device is configured to transmit the transaction authentication program information to the computer device via near-field communication;

wherein the computer device is configured to execute the transaction authentication program; and wherein the transaction authentication program is configured to:

detect at least one website being visited by the computer device;

in response to the database file not comprising user information corresponding to the at least one website, capture the user information input by the user on the at least one website and obtain attribute name information corresponding to the user information input by the user on the at least one website by analyzing a source code of the at least one website by the computer device; and in response to the database file comprising user information corresponding to the at least one website, input the user information corresponding to the at least one website in the database file into the at least one website and input the user information corresponding to the at least one website to at least one column on the at least one website according the corresponding attribute name information, wherein the computer device is configured to:

determine completion of a transaction on the at least one website by a user; and transmit the database file to the mobile device from the computer device and delete the transaction authentication program information stored in the computer device upon completion of the transaction.

9. The electronic system as claimed in claim 8, wherein the transaction authentication program information further comprises a script command corresponding to the transaction authentication program, and the computer device is configured to automatically execute the transaction authentication program according to the script command.

10. The electronic system as claimed in claim 8, wherein the database file records the user information input by the user and associated update dates of different websites, and the user information input by the user having the most recent update date is recorded into the database file first by the mobile device.

11. The electronic system as claimed in claim 8, wherein the user information corresponding to the at least one website and the user information input by the user comprises at least one of a user account and a corresponding password of a user, a telephone number, an address, at least one button operation on the at least one website, at least one option operation on the at least one website, credit card information of the user and debit card information of the user.

12. The electronic system as claimed in claim 8, wherein the computer device is further configured to update the captured user information input by the user to the database file.

13. The electronic system as claimed in claim 8, wherein the mobile device is further configured to recognize a user of the mobile device by executing a mobile transaction authentication program, and transmit the database file corresponding to the user to the computer device.

14. The electronic system as claimed in claim 13, wherein the database file is editable by the user via the mobile transaction authentication program executed by the mobile device.

* * * * *